Nov. 28, 1961 M. L. COVER Re. 25,092
SINTERING MACHINE
Original Filed Jan. 2, 1948 3 Sheets-Sheet 1
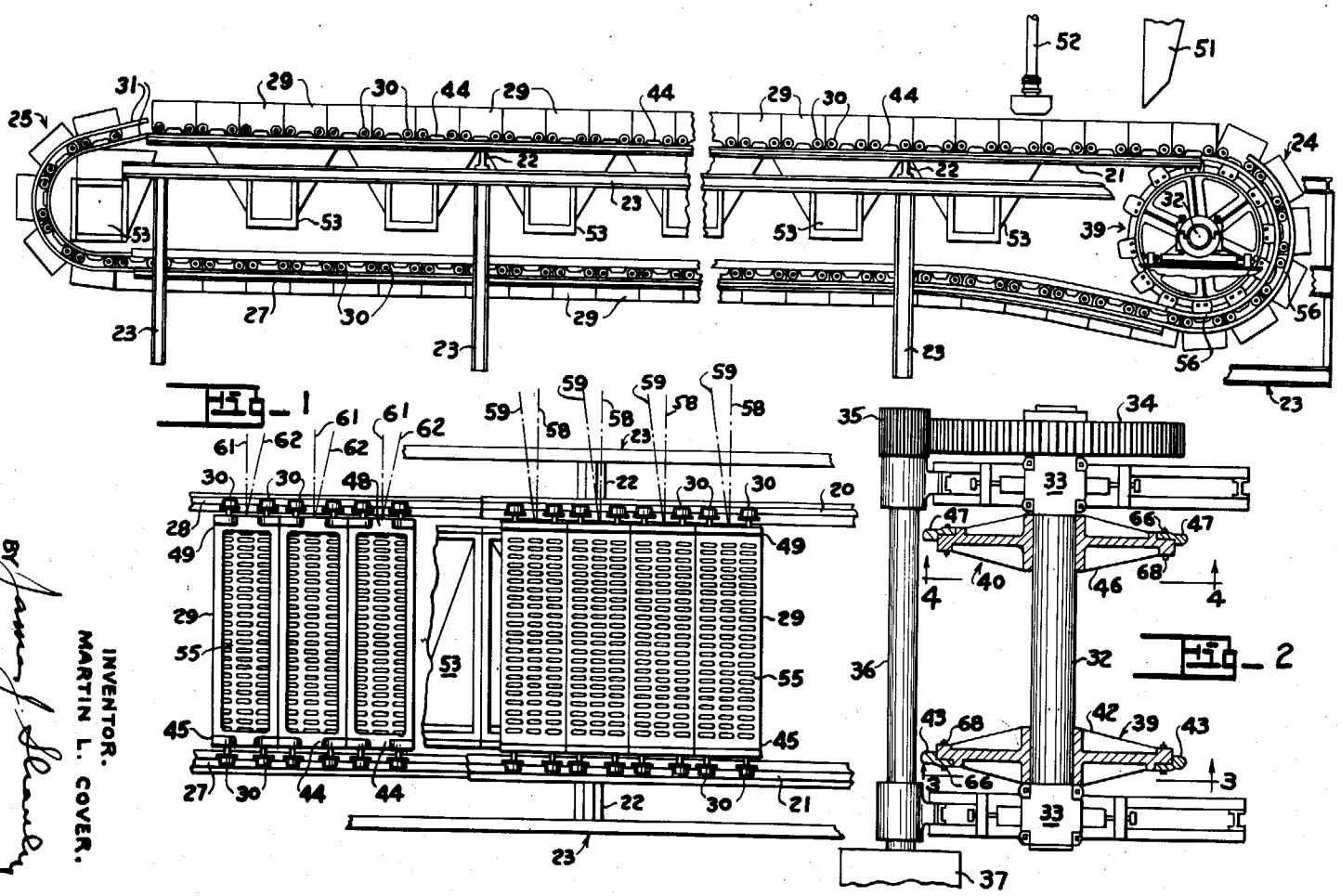
INVENTOR.
MARTIN L. COVER.
By James J. Shanley
ATTORNEY.

Nov. 28, 1961 M. L. COVER Re. 25,092

SINTERING MACHINE

Original Filed Jan. 2, 1948 3 Sheets-Sheet 2

INVENTOR.
MARTIN L. COVER.

BY James J. Shanley
ATTORNEY.

Nov. 28, 1961 M. L. COVER Re. 25,092
SINTERING MACHINE
Original Filed Jan. 2, 1948 3 Sheets-Sheet 3
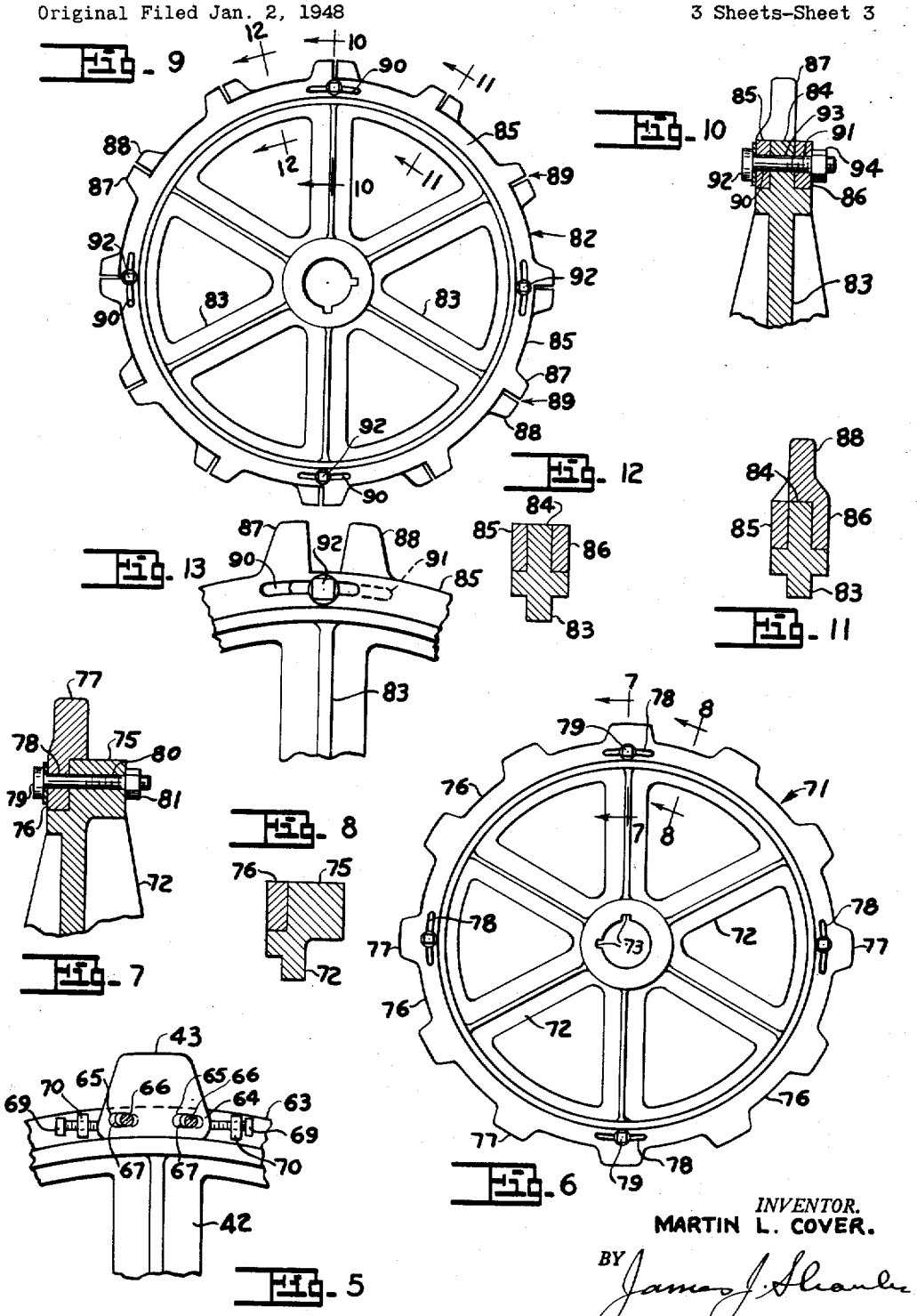
INVENTOR.
MARTIN L. COVER.
BY James J. Shanks
ATTORNEY.

United States Patent Office

Re. 25,092
Reissued Nov. 28, 1961

25,092
SINTERING MACHINE

Martin L. Cover, Churchville, N.Y., assignor to National Steel Corporation, a corporation of Delaware Original No. 2,647,615, dated Aug. 4, 1953, Ser. No. 44, Jan. 2, 1948. Application for reissue Feb. 24, 1961, Ser. No. 91,560
15 Claims. (Cl. 198—108)

Matter enclosed in heavy brackets [ ] appears in the original patent but forms no part of this reissue specification; matter printed in italics indicates the additions made by reissue.

The present invention relates to improvements in sintering machines of the type adapted to sinter a charge including metal bearing material and combustion supporting material to effect agglomeration or agglomeration and at least partial reduction of the metal bearing material.

Relatively fine iron bearing material, such as fine iron ore, flue dust, and the like, cannot be used in furnaces to produce iron and steel. In order to utilize such fine materials in a furnace it is necessary to sinter the fine particles to form agglomerates. At times, it is desirable to sinter, for example, iron ore containing relatively large amounts of sulphur both to reduce the sulphur content and to agglomerate the particles. The sintering charge also includes sufficient combustion supporting material, such as sulphur or carbon, to burn and generate heat to effect agglomeration. Generally, the material to be sintered includes both small particles commonly designated as "fines" and relatively larger particles which are referred to as "aggregates" to permit the passage of air through the charge to support combustion.

The present invention will be described more particularly in connection with the sintering of charges containing iron bearing materials such as iron ore fines, dry flue dust, wet flue dust, mill scale, and the like and containing combustion supporting materials such as carbon particles present in the flue dust, coke breeze, and the like. It is to be understood that the present invention is not limited to the sintering of any particular metal bearing material or mixtures of such materials.

The various ingredients of the charge are mixed and continuously deposited in a uniform layer upon the moving pallets or grates of the sintering machine. A well known type of sintering machine includes upper rails which support moving pallets carrying the charge from the feed or entry end to the discharge end of the machine. As the pallets move along the upper rails the charge is deposited in a layer onto the pallets and the particles of combustion supporting material are then ignited in a zone at the upper surface of the layer. The pallets then pass above the series of wind boxes which produce a downdraft through the charge to propagate combustion gradually downwardly through the material to generate sufficient heat to agglomerate the particles of iron bearing material. At the discharge end of the machine, the pallets are emptied and then moved and urged downwardly and back along the lower rail means to the entry end of the machine where there is a power-actuated sprocket means that raises the pallets back up and onto the upper rails and pushes the pallets along these upper rails. A sintering machine of this type is usually large, the parts are made heavy to withstand the heat and abrasive conditions and is operated substantially continuously. A sintering machine may, for example, produce from 1,000 to 1,200 tons of sinter in a 24-hour day.

In actual practice, it is impossible to set up and operate such a machine so that the pallets will move properly along the rails. The pallets crowd toward one side or the other of the rails and, in addition, the pallets assume a biased position on the rails all of which causes excessive abrasion and wearing away of the parts and at times causes the pallets to jerk as a result of the binding of the parts. As a consequence, the machine must be repaired quite often and maintenance costs are high. Further, when the pallets do not move smoothly, proper sintering may not be effected. Various theories have been advanced as to why the pallets will not move along the rails properly and modifications have been made in such machines in accordance with these theories, but these modifications have not been the answer to the problem. Consequently, the cost of maintaining and operating these machines has been quite high and the industry is still seeking some way of effecting proper operation of these machines. Apparently, there are a number of factors all contributing more or less to this canting and crowding of the pallets and it is believed that these have not been taken into consideration by the above mentioned previous theories. One factor is that it is necessary to provide large tolerances for the moving and interfitting parts to prevent excessive abrasion of the parts. There are fairly large quantities of fine abrasive dust around such machines and the parts are subjected to widely different temperature ranges. If the parts fitted tightly together, the parts would more quickly wear away and would tend to bind. Another factor contributing to improper movement and non-alignment of the pallets is that there is a long column of heavy pallets extending along the rails. The length of these pallets is considerably less than their width so that they are unstable. A perfect balance of forces would have to be maintained to keep such a column of unstable pallets in perfect balance or alignment on the rails. In practice, it is impossible to maintain such a perfect balance that the pallets do not crowd toward one side of the rails. An additional factor contributing to misalignment of the pallets is the fact that the parts become worn relatively quickly. As a result of these and possibly other factors, sintering machine pallets have, in practice heretofore, moved improperly along the rails. This improper movement has included first, crowding of the pallets toward one side or the other of the rails and second, twisting or canting of the pallets on the rails so that the pallets do not extend normal to the rails, that is, the pallets are not properly aligned on the rails. These effects are accumulative with one increasing the other. Crowding of the pallets soon becomes excessive and the pallets are jerked along the rails instead of being moved smoothly and uniformly along the rails. Consequently, shut-downs and repairs are frequent and excessive and the machine does not function at its highest efficiency.

In the past and in accordance with some of the theories as to why the pallets did not move properly along the rails, attempts have been made to shift one sprocket relative to the other at the time of initial assembly to compensate for the subsequent twist in the sprocket shaft when loaded so that the sprocket teeth would be in alignment during operation of the machine. Such attempts have stemmed from the thought that misalignment of the pallets was possibly caused by twisting of the sprocket shaft with consequent misalignment of the sprockets and the pallets. Although twisting of the shaft may or may not be one factor contributing to improper movement of the pallets along the rails, such shifting of the sprockets has not proved to be the answer to the problem. Possibly, one reason is that it is impossible to foretell how much twist will take place. Another and possibly the correct reason is that when attempting to balance a long column of unstable pallets, the chances are that the column of pallets will shift or tilt one way or the other and it is impossible to foretell which direction the pallets will tend to tilt.

Accordingly, it is an object of the present invention to provide a sintering machine so constructed and arranged as to eliminate objectionable misalignment of the pallets.

Another object of the present invention is to provide a sintering machine adapted to effect proper balancing of the column of pallets moving along the upper and lower rails.

It is also an object of the present invention to prevent objectionable crowding of the pallets of a sintering machine toward one side or the other of the rails.

Another object of the present invention is to provide a sintering machine adapted to readily compensate for wear and abrasion of the parts.

It is also an object of the present invention to provide a sintering machine adapted to compensate for any twisting of the sprocket shaft which may take place under differing conditions and at different periods.

A further object of the present invention is to provide a sintering machine which can be continuously operated with fewer breakdowns and less frequent and extensive repairs.

In accordance with the present invention, the sprocket means for lifting the pallets from the lower rails up onto the upper rails and for pushing the pallets along the upper rails is so constructed and arranged that the pallets can be properly positioned and aligned on the machine at any period during its life so that the pallets will not unduly crowd toward one side or the other and so that the pallets will not assume an objectionable biased position. The pallets can be and are so balanced that they move properly along the rails without objectionable crowding or binding not only when the machine is first assembled, but compensations can be made to maintain this balance at any time to compensate for wear and abrasion. Further, the sprocket means can be readily adjusted to compensate for twisting, if any, of the shaft. By means of the present invention, it is now possible for the first time to operate a sintering machine with the pallets moving along the rails in such a manner that there is no objectionable crowding or canting of the pallets which causes excessive wear and abrasion.

These and other objects and advantages will become more readily apparent from the following detailed description, taken in connection with the accompanying drawings, in which:

FIGURE 1 is a side view, partially in section, of sintering apparatus from which some of the parts have been removed to more clearly show the essential portions of the apparatus;

FIGURE 2 is a fragmentary, enlarged plan view, partially in section, of the apparatus of FIGURE 1;

FIGURE 5 is an enlarged fragmentary view partially in section of a portion of the sprocket of FIGURE 3;

FIGURE 6 is an elevational view illustrating a modification of the present invention;

FIGURE 7 is an enlarged fragmentary, sectional view taken along line 7—7 of FIGURE 6;

FIGURE 8 is an enlarged fragmentary, sectional view taken along line 8—8 of FIGURE 6;

FIGURE 9 is an elevational view of a different embodiment of the present invention;

FIGURE 10 is an enlarged fragmentary, sectional view taken along line 10—10 of FIGURE 9;

FIGURE 11 is an enlarged fragmentary, sectional view taken along line 11—11 of FIGURE 9;

FIGURE 12 is an enlarged fragmentary, sectional view taken along line 12—12 of FIGURE 9; and FIGURE 13 is an enlarged fragmentary view of a portion of the sprocket of FIGURE 9 showing the sprocket tooth portions adjusted to a different position.

Figure 3:
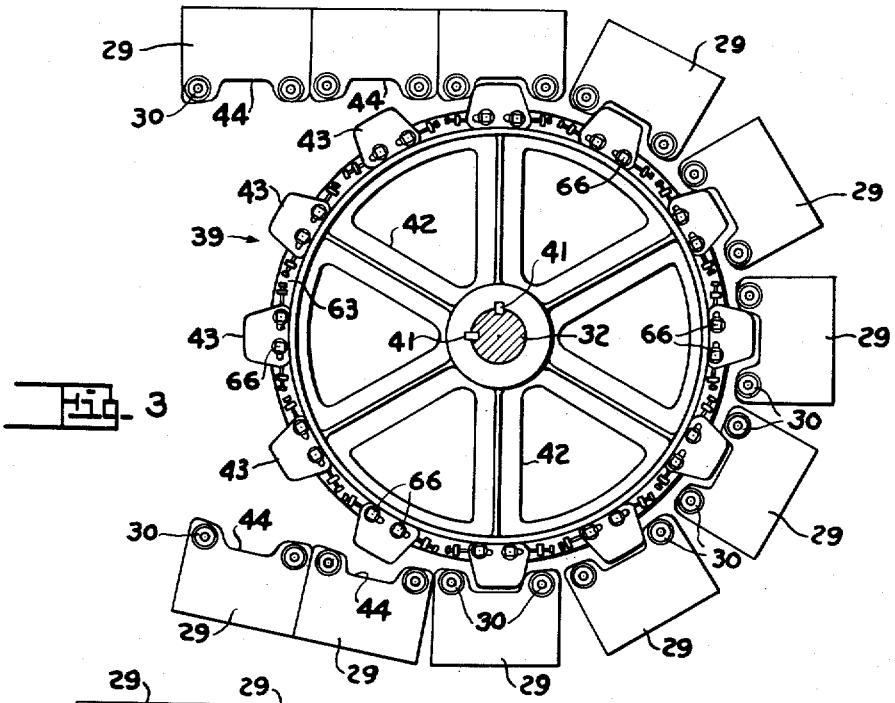
FIGURE 3 is an enlarged fragmentary, sectional view taken along line 3—3 of FIGURE 2 and showing one of the sprockets.

Referring to the drawings and more particularly to FIGURES 1 and 2 which show a sintering machine of the type with which the present invention is concerned, the apparatus includes a pair of upper rails 20 and 21 mounted on cross-members 22 supported by the machine framework 23. The rails 20 and 21 extend from the feed or loading end 24 of the machine to the discharge end 25 of the machine. The framework 23 also supports a pair of lower return rails 27 and 28 and these lower rails are inclined downwardly at the entry end 24 for reasons more fully hereinafter set forth. A plurality of pallets 29 are mounted on the upper and lower rails and each pallet 29 has a pair of rollers 30 at each side which ride on the corresponding rails. At the discharge end 25 of the machine there are two pairs of spaced, arcuate rails 31 for guiding the pallets 29 from the upper rails down onto the lower rails 27 and 28. At the entry end 24 there is a sprocket shaft 32 rotatably mounted in a pair of bearings 33 and having connected thereto a spur gear 34 meshing with a drive pinion 35 mounted on a shaft 36 which is driven by a suitable power-actuated drive mechanism at 37. The drive mechanism at 37 may be of any suitable type and may include, for example, an electric motor and a gear reducer of conventional construction. A pair of sprockets 39 and 40 are mounted on the sprocket shaft 32 and each sprocket is connected to the shaft for rotation therewith by a pair of keys 41, FIGURES 3 and 4. The sprocket 39 includes a body portion 42 wihich has a set of sprocket teeth 43 mounted about its periphery. The teeth 43 are adapted to engage the recesses 44 at the left-hand sides 45 of the pallets 29. The sprocket 40 includes a body portion 46 and a set of sprocket teeth 47 adapted to engage the recesses 48 at the right-hand sides 49 of the pallets 29.

In operation which is continuous, the pallets 29 are progressively moved along the upper rails 20 and 21 on rollers 30. The pallets are filled by a loading device, schematically indicated at 51 with a uniform layer of the charge. As the loaded pallets are moved further along the upper rails, the combustible particles in a zone at the upper surface are ignited by a burner 52. The pallets 29 then move across a series of wind boxes 53 connected to a blower, not shown, which draws a blast of air down through the charge to propagate combustion downwardly through the charge to, or substantially to, the charge-supporting grates 55 of the pallets to effect agglomeration of the metal bearing particles. When the pallets 29 arrive at the discharge end, they pass between the arcuate rails 31, dump the sinter and then move down onto the lower rails 27 and 28 where the pallets are in the inverted position. The rails 27 and 28, at least adjacent the feed end 24, are inclined downwardly so that the pallets are urged toward the sprockets 39 and 40 under the influence of gravity. A sufficient number of pallets preferably are mounted on the rails so that some pallets are between guide rails 31 and the weight of these pallets also urges the pallets on the lower rails 27 and 28 toward the sprockets. As the sprockets 39 and 40 rotate, each tooth 43 engages a recess 44 of a corresponding pallet and simultaneously an opposite or corresponding tooth 47 of sprocket 40 engages the recess 48 at the opposite side of the same pallet 29. Thus, a pair of transversely spaced apart sprocket teeth 43 and 47 of the rotating sprockets successively lift each of the returning pallets 29 from lower rails 27 and 28 through an arc up onto the upper rails 20 and 21 and then push the pallets along the upper rails. Spaced, arcuate guide rails 56 hold the pallets on the sprockets as they rotate. It is to be noted that rails 27 and 28 and guide rails 31 constitute means for returning the pallets to the entry end of the machine and for urging the pallets toward the sprockets and end 24.

The sintering machine so far described is of a conventional type except for the details of construction of the sprockets 39 and 40. Prior machines have included sprockets but not sprockets constructed as will be more fully hereinafter described when discussing the present invention.

The following description is for the purpose of illustrating more clearly the difficulties encountered with crowding, misalignment and binding of the pallets on the rails. In one installation of a sintering machine, the pallets on the upper rails crowded toward the left-hand rail 21. These pallets also assumed a biased position on the rails with the right-hand side 49 of the pallets assuming a position ahead of the left-hand side 45 of the pallets 29. This biased condition is illustrated by lines 58 and 59. Each line 58 indicates the transverse axis of the corresponding pallet when the pallet extends in a direction normal to the rails. Line 59 indicates the direction of the transverse axis of the corresponding pallets in the position actually assumed. The angle between lines 58 and 59 has been somewhat exaggerated for purposes of illustration. In this same installation, the pallets on the lower rails crowded toward rail 27 and the right-hand side 49 of the pallets assumed a position ahead of the opposite left-hand side 45 of the pallets as indicated by lines 61 and 62. Each line 61 indicates the direction of the transverse axis of a pallet when extending in a direction normal to the rails 27 and 28 and line 62 illustrates the biased position the pallets actually assumed. With the pallets assuming these positions and crowding toward the left-hand side, abrasion and wearing away of the parts soon become excessive. As the parts wore away, crowding and misalignment of the pallets increased which in turn increased the rate of abrasion and caused binding of the pallets so that the pallets at least at times moved spasmodically along the rails. Although in this particular machine the pallets on both the upper rails and lower rails crowded toward the same side, it is to be understood that the pallets on the upper rails may crowd toward a side in a direction opposite to that of the pallets on the lower rails. Additionally, the side of the pallet which is leading on the upper rails may be trailing on the lower rails. Although, it is possible to assemble or repair a machine so that it will operate fairly well at first, crowding and canting of the pallets does take place and is objectionable for reasons set forth previously.

In accordance with the present invention, the sprocket means at the feed end 24 of the sintering apparatus is constructed and arranged in an improved manner to prevent and to overcome objectionable misalignment and crowding of the pallets. Referring to the embodiment shown in FIGURES 1 to 5, inclusive, and more particularly to FIGURES 3, 4 and 5, the sprockets 39 and 40 are each similarly constructed and only sprocket 39 will be described in detail. The body portion 42 of the sprocket 39 includes an outer rim 63 on which are seated the sprocket teeth 43. Each tooth 43 includes a leg 64 which extends inwardly along the side face of rim 63 and includes a pair of elongated arcuate holes 65. A bolt 66 extends through each hole 65 and through an elongated arcuate hole 67 in rim 63. Each bolt 66 has a nut 68 threaded onto it. The nuts 68 can be tightened to hold the tooth 43 in position and can be loosened to permit adjustment of the tooth through an arc about the axis of the sprocket and about the rim 63. As an additional releasable locking and adjusting means there is provided on each side of each tooth 43 a bolt 69 extending through a lug 70 on the side of the sprocket rim. The inner ends of bolts 69 engage opposite sides of the tooth and by adjusting the bolts 69 after bolts 66 have been loosened, the tooth 43 can be accurately moved to a new position. The teeth 47 of sprocket 40 are similarly mounted and the corresponding parts of the releasable locking means have been designated by the same reference numerals. When adjusting the teeth on either sprocket 39 or 40 all of the teeth 43 or 47 are adjusted equal amounts in an arc about the axis of shaft 32 relative to the rotatable support which in this embodiment includes the body portion 42 or 46 mounted on shaft 32.

Figure 4:
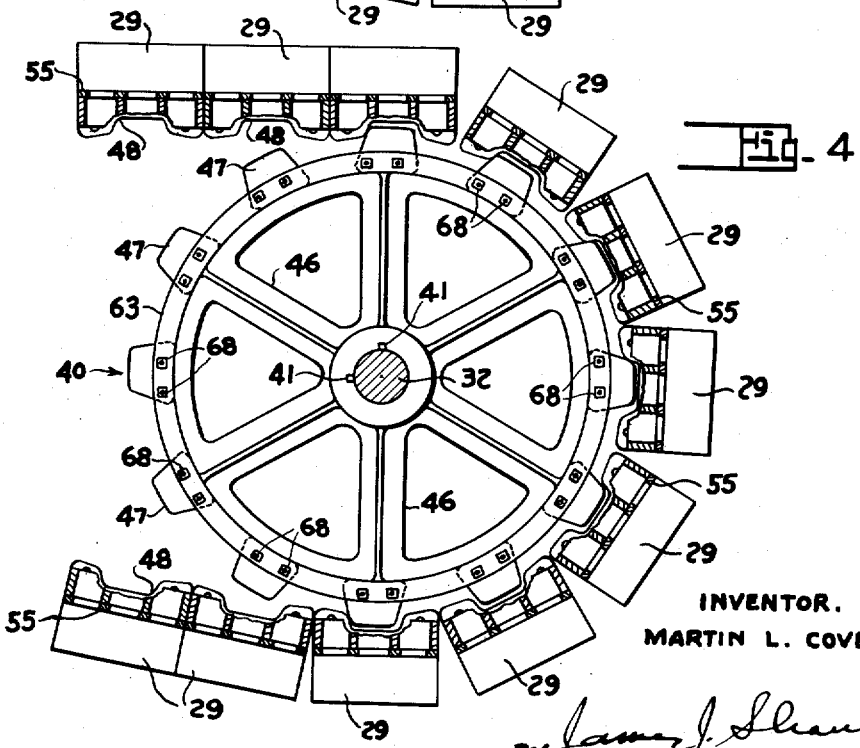
FIGURE 4 is an enlarged fragmentary, sectional view taken along line 4—4 of FIGURE 2 showing the other sprocket.

When the pallets on the upper and lower rails assume the biased position indicated by lines 59 and 62, the sprocket teeth 43 and 47 are adjusted as shown in FIGURES 3 and 4. Assuming the teeth 43 and 47 are in alignment with the pallets biased as described, all of the teeth 43 are adjusted in a counterclockwise direction to push ahead the left-hand sides of the pallets 29 on the upper rails 20 and 21. The teeth 43, for example, in one sintering machine, were positioned so that the leading edge of each tooth 43 was about 1½ inches ahead of the leading edge of the corresponding tooth 47. This adjustment of the teeth 43 did prevent objectionable crowding of the pallets on the upper rails toward the left-hand rail but did not prevent objectionable crowding toward the left-hand rail 27 by the pallets 29 on the lower rails 27 and 28. In this particular installation it was necessary to adjust the teeth 47 in a clockwise direction so that the trailing edge of each tooth was in effect moved about 1½ inches relative to the corresponding tooth 43. It will be noted in FIGURES 3 and 4 that the teeth 43 and 47 have been adjusted so as to move the pallets slightly beyond the normal position to counteract or overcome the tendency of the pallets 29 to crowd toward the left. The necessity of adjusting the teeth 47 auparently arises from the fact that the pallets on the lower rails 27 and 28 are urged downwardly and toward the sprockets and it is necessary to hold back the left-hand sides 45 of these pallets. It will be noted by comparing FIGURES 3 and 4 that as the sprocket teeth engage the pallets to lift them, the leading edge of tooth 43 engages the forward side of the recess 44 and the trailing edge of tooth 47 engages the rearward side of recess 48 to push forwardly and rearwardly the corresponding sides of the pallets. As shown in FIGURE 4, the right-hand sides of the pallets on the lower rails tend to push ahead. As the pallets are raised by the sprockets, the right-hand side moves downwardly until the tooth 47 engages the forward side of recess 48. When the pallets reach the top of the sprockets each tooth 43 and 47 engages the forward side of the corresponding recess. The leading edge of tooth 43 is ahead of the leading edge of tooth 47 so that the pallets 29 on the upper rails are biased a slight amount in an opposite direction from that originally described and indicated by lines 59 and 62. This biasing or canting of the pallets effected by adjustment of the teeth prevents objectionable crowding of the pallets toward the left-hand rails and does not cause objectionable crowding toward the right-hand rails. If the teeth are adjusted too far objectionable crowding toward the right-hand rails may take place.

Referring more particularly to FIGURES 6, 7 and 8 which show a different sprocket 71 that can be substituted for sprockets 39 and 40, the sprocket 71 includes a body portion 72 containing keyways 73 for connecting it to shaft 32 and has an outer rim 75 on which is movably mounted a ring 76 having formed thereon a plurality of sprocket teeth 77. The ring 76 includes a plurality of arcuate slots 78. A bolt 79 extends through each slot 78 and a corresponding hole 80 in rim 75 with a nut 81 threaded onto its inner end. The nuts 81 can be loosened and the ring 76 and teeth 77 adjusted in an arc about the axis of the shaft. The nuts 81 can then be tightened to lock the ring 76 and teeth 77 in the adjusted position. The method of adjusting the teeth of sprocket 71 is the same as the method of adjusting the teeth of sprockets 39 and 40. The sprocket 71 has an important advantage over the type of sprocket 39 or 40 in that with sprocket 71 one adjustment simultaneously adjusts all of the teeth and it is not necessary to individually adjust each tooth.

When the sprockets are constructed as shown in FIGURE 5 or in FIGURE 6, it is preferable that both sprockets be constructed so that the teeth can be adjusted, although it is to be understood that one of the sprockets may be constructed in the customary manner with fixed teeth. With the last mentioned type of sprockets it is necessary to adjust the adjustable teeth twice the distance, which at times may be undesirable.

Referring more particularly to FIGURES 9 to 13, inclusive, which illustrate another type of sprocket 82 that can be substituted for sprockets 39 and 40, the sprocket 82 includes a body portion 83 having an outer rim portion 84. Two rings 85 and 86 are movably mounted on rim portion 84. Ring 85 includes integral leading tooth portions 87 and ring 86 includes integral trailing tooth portions 88. Each tooth portion 87 forms with its corresponding tooth portion 88 one composite tooth 89 adapted to engage the corresponding recess of the pallet 29. The rings 85 and 86 include elongated slots 90 and 91, respectively. A bolt 92 extends through each pair of these slots 90 and 91 and a hole 93 in rim 85. A nut 94 is threaded onto one end of each bolt 92. The nuts 94 can be loosened and the rings 85 and 86 turned in the same direction, or in opposite directions on rim 84, or one ring 85 or 86 can be turned without turning the other ring to adjust the leading and trailing portions of teeth 89 relative to each other. When the sprocket of FIGURE 9 is used, both sprockets are preferably made alike to obtain full advantage of this construction.

Assuming that the pallets are biased as indicated by the lines 59 and 62 and that each of sprockets 39 and 40 has been replaced by a sprocket 82, then the ring 85 of the left-hand sprocket (same side as sprocket 39) is turned in a counterclockwise direction and locked in place to push the left-hand sides 45 of the pallets on the upper rails ahead. The ring 86 of the right-hand sprocket is adjusted in a clockwise direction to hold back the right-hand sides 49 of the pallets on the lower rails. Thus, by adjusting only the leading edge portions 87 of the teeth of one sprocket and the trailing edge portions 88 of the other sprocket, the same adjustment is obtained as has been described in connection with the other sprockets. This type of adjustment separates the tooth portions 87 and 88 and in effect increases the thickness of tooth 89. The tooth portions should not be so widely spread apart that the tooth 89 is as wide as the corresponding recess as it is desirable to have the sprocket tooth 89 smaller than the recess, as are the teeth of the other sprockets, to reduce wear. Normally, the sprocket teeth are considerably smaller than the recess which provides sufficient space for adjustment. Where the amount of adjustment necessary is quite large, both tooth portions may be adjusted in the same direction with one tooth portion being adjusted a greater amount than the other, if desirable.

An important advantage obtainable with sprockets 82 is that better alignment of the pallets can be obtained. For example, with the leading and trailing tooth portions of opposite sprockets adjusted as described, the nonadjusted trailing tooth portions 88 of the left-hand sprocket or the leading edge portions 87 of the right-hand sprocket can also be adjusted to control more accurately the amount that the pallets are biased in the opposite direction. Another important advantage obtainable with sprockets 82 is that a greater variety of adjustments can be made. For example, if the pallets on the upper rails are crowding toward one side and the pallets on the lower rails are not crowding toward one side in an objectionable manner, then the leading tooth portions on the side toward which the pallets crowd on the upper rails can be adjusted ahead to overcome this condition without disturbing the trailing tooth portions of either sprocket.

After the sprockets have been adjusted to prevent objectionable crowding of the pallets, the pallets will move smoothly along the rails and abrasion and wearing away of the parts is greatly reduced. This increases the life of the parts and reduces the cost of repairs and the time required for maintaining the machine in proper order. At least at times, it will be necessary to make subsequent adjustments of the sprocket teeth as a result of the wearing away of the parts. These subsequent adjustments are, in addition to the adjustment required to have a newly assembled machine function properly. These adjustments of the sprocket teeth after first assembling the machine are required as it is impossible to forecast in what direction the pallets will crowd. It is necessary to assemble the sintering machine and operate it to determine that side toward which the pallets crowd and to determine what position the pallets will assume. The action of the pallets is not accurately predicatable. Although wear may increase objectionable crowding of the pallets, it is only a partial cause of crowding and objectionable crowding does take place before there is any wear on the parts.

It is to be understood that the sprockets need not be constructed exactly the same. For example, one sprocket may be constructed like sprocket 82 and the other sprocket constructed like either of the other sprockets. In each of the embodiments shown and described, at least the leading or trailing portions of the teeth of one sprocket are not in alignment. Thus, at least corresponding portions of the teth of each pair are not in alignment and this misalignment prevents objectionable crowding of the pallets.

I claim:

1. In apparatus for continuously sintering metal bearing material, the combination comprising a plurality of pallets for supporting such material, upper rail means supporting a plurality of pallets for movement therealong while supporting the material being sintered, lower rail means supporting a plurality of empty pallets for return movement therealong in an opposite direction, power-actuated sprocket means at one end of the rail means and rotatable about a horizontal transverse axis to lift the returning pallets from the lower rail means through an arc to the upper rail means and to push the lifted pallets along the upper rail means, said sprocket means including a rotatable support for the sprocket teeth rotatable on said axis, two sets of transversely spaced apart teeth arranged about the periphery of the support and adapted to engage opposite side portions of the pallets, the teeth of at least one set being movable relative to the support in an arc about said axis, and releasable locking means operable to lock the movable teeth in a fixed predetermined position on the support and operable to permit such movement of the movable teeth relative to said support.

2. In apparatus for continuously sintering metal bearing material, the combination comprising a plurality of pallets for supporting such material, upper rail means supporting a plurality of pallets for movement therealong while supporting the material being sintered, lower rail means supporting a plurality of empty pallets for return movement therealong in an opposite direction, power-actuated sprocket means at one end of the rail means and rotatable about a horizontal transverse axis to lift the returning pallets from the lower rail means through an arc to the upper rail means and to push the lifted pallets along the upper rail means, said sprocket means including a rotatable support for the sprocket teeth rotatable on said axis, two sets of transversely spaced apart teeth arranged about the periphery of the support and adapted to engage opposite side portions of the pallets, the teeth of each set being movable relative to the teeth of the other set and to the support in an arc about said axis, and releasable locking means operable to lock the movable teeth in a fixed predetermined position on the support and operable to permit such movement of the movable teeth relative to said support.

3. In apparatus for continuously sintering metal bearing material, the combination comprising a plurality of pallets for supporting such material, upper rail means supporting a plurality of pallets for movement therealong while supporting the material being sintered, lower rail means supporting a plurality of empty pallets for return movement therealong in an opposite direction, power-actuated sprocket means at one end of the rail means and rotatable about a horizontal transverse axis to lift the returning pallets from the lower rail means through an arc to the upper rail means and to push the lifted pallets along the upper rail means, said sprocket means including a rotatable support for the sprocket teeth rotatable on said axis, two sets of transvserly spaced apart teeth arranged about the periphery of the support and adapted to engage opposite side portions of the pallets, each tooth of at least one set being formed of separate leading and trailing portions and the leading tooth portions of said one set of teeth being connected together and movable relative to the support in an arc about said axis, and releasable locking means operable to lock the movable leading tooth portions in a fixed predetermined position on the support and operable to permit such movement of the movable leading tooth portions relative to said support.

4. In apparatus for continuously sintering metal bearing material, the combination comprising a plurality of pallets for supporting such material, upper rail means supporting ap lurality of pallets for movement therealong while supporting the material being sintered, lower rail means supporting a plurality of empty pallets for return movement therealong in an opposite direction, power-actuated sprocket means at one end of the rail means and rotatable about a horizontal transverse axis to lift the returning pallets from the lower rail means through an arc to the upper rail means and to push the lifted pallets along the upper rail means, said sprocket means including a rotatable support for the sprocket teeth rotatable on said axis, two sets of transversely spaced apart teeth arranged about the periphery of the support and adapted to engage opposite side portions of the pallets, the teeth of each set being independently movable relative to the teeth of the other set and to the support in an arc about said axis, and releasable locking means operable to lock the movable teeth in a fixed predetermined position on the support and operable to permit movement of the movable teeth relative to said support.

5. In apparatus for continuously sintering metal bearing material, the combination comprising a plurality of pallets for supporting such material, upper rail means supporting a plurality of pallets for movement therealong while supporting the material being sintered, lower rail means supporting a plurality of empty pallets for return movement therealong in an opposite direction, power-actuated sprocket means at one end of the rail means and rotatable about a horizontal transverse axis to lift the returning pallets from the lower rail means through an arc to the upper rail means and to push the lifted pallets along the upper rail means, said sprocket means including a rotatable support for the sprocket teeth rotatable on said axis, two sets of transversely spaced apart teeth arranged about the periphery of the support and adapted to engage opposite side portions of the pallets, the teeth of each set being movable in unison relative to the teeth of the other set and to the support in an arc about said axis, and releasable locking means operable to lock the movable teeth in a fixed predetermined position on the support and operable to permit movement of the movable teeth relative to said support.

6. In apparatus for continuously sintering metal bearing material, the combination comprising a plurality of pallets for supporting such material, upper rail means supporting a plurality of pallets for movement therealong while supporting the material being sintered, lower rail means supporting a plurality of empty pallets for return movement therealong in an opposite direction, power-actuated sprocket means at one end of the rail means and rotatable about a horizontal transverse axis to lift the returning pallets from the lower rail means through an arc to the upper rail means and to push the lifted pallets along the upper rail means, said sprocket means including a rotatable support for the sprocket teeth rotatable on said axis, two sets of transversely spaced apart teeth arranged about the periphery of the support and adapted to engage opposite side portions of the pallets, each tooth of at least one set being formed of separate leading and trailing portions and the leading tooth portions of said one set of teeth being connected together and movable relative to the support in an arc about said axis and the trailing tooth portions being connected together and independently movable relative to the support in an arc about said axis, and releasable locking means operable to lock the movable tooth portions in a fixed predetermined position on the support and operable to permit such movement of the movable tooth portions relative to said support.

7. In apparatus for continuously sintering metal bearing material, the combination comprising a plurality of pallets for supporting such material, upper rail means supporting a plurality of pallets for movement therealong while supporting the material being sintered, lower rail means supporting a plurality of empty pallets for return movement therealong in an opposite direction, power-actuated sprocket means at one end of the rail means and rotatable about a horizontal transverse axis to lift the returning pallets from the lower rail means through an arc to the upper rail means and to push the lifted pallets along the upper rail means, said sprocket means including a rotatable support for the sprocket teeth rotatable on said axis, two sets of transversely spaced apart teeth arranged about the periphery of the support and adapted to engage opposite side portions of the pallets, ring means supporting at least one set of teeth on the rotatable support and being movable back and forth relative to the support in an arc about said axis, and releasable locking means operable to lock the ring means in a fixed predetermined position on the support and operable to permit such movement of the ring means relative to said support.

8. In apparatus for continuously sintering metal bearing material, the combination comprising a plurality of pallets for supporting such material, upper rail means supporting a plurality of pallets for movement therealong while supporting the material being sintered, lower rail means supporting ap lurality of empty pallets for return movement therealong in an opposite direction, power-actuated sprocket means at one end of the rail means and rotatable about a horizontal transverse axis to lift the returning pallets from the lower rail means through an arc to the upper rail means and to push the lifted pallets along the upper rail means, said sprocket means including a rotatable support for the sprocket teeth rotatable on said axis, two sets of transversely spaced apart teeth arranged about the periphery of the support and adapted to engage opposite side portions of the pallets, separate ring means supporting each set of teeth on the rotatable support and each ring means being movable back and forth relative to the support in an arc about said axis, and releasable locking means operable to lock the ring means in a fixed predetermined position on the support and operable to permit such movement of the ring means relative to said support.

9. In apparatus for continuously sintering metal bearing material, the combination comprising a plurality of pallets for supporting such material, upper rail means supporting a plurality of pallets for movement therealong while supporting the material being sintered, lower rail means supporting a plurality of empty pallets for return movement therealong in an opposite direction, power-actuated sprocket means at one end of the rail means and rotatable about a horizontal transverse axis to lift the returning pallets from the lower rail means through an arc to the upper rail means and to push the lifted pallets along the upper rail means, said sprocket means including a rotatable support for the sprocket teeth rotatable on said axis, two sets of transversely spaced apart teeth arranged about the periphery of the support and adapted to engage opposite side portions of the pallets, ring means including two ring members supporting a set of the teeth on the rotatable support, the supported set of teeth being formed of separate leading and trailing portions and one ring member carrying the leading tooth portions and the other ring member carrying the trailing tooth portions and both ring members being movable relative to the support and each other in an arc about said axis, and releasable locking means operable to lock the ring members in a fixed predetermined position on the support and releasable to permit such movement of the ring members relative to said support.

10. In apparatus for continuously sintering metal bearing material, the combination comprising a plurality of pallets for supporting such material, upper rail means supporting a plurality of pallets for movement therealong while supporting the material being sintered, lower rail means supporting a plurality of empty pallets for return movement therealong in an opposite direction, power-actuated sprocket means at one end of the rail means and rotatable about a horizontal transverse axis to lift the returning pallets from the lower rail means through an arc to the upper rail means and to push the lifted pallets along the upper rail means, said sprocket means including a rotatable support for the sprocket teeth rotatable on said axis, two sets of transversely spaced apart teeth arranged about the periphery of the support and adapted to engage opposite side portions of the pallets, the teeth of each set being formed of separate leading and trailing portions, separate ring means supporting each set of teeth on the rotatable support, each ring means including two ring members, each ring member being movable relative to the support in an arc about said axis, one ring member of each ring means carrying the leading portions of the teeth and the second ring member carrying the trailing portions of the teeth of the corresponding set, and releasable locking means operable to lock the ring members of each ring means in a fixed predetermined position on the support and operable to permit such movement of the ring members relative to said support.

11. In apparatus for continuously sintering metal bearing material, the combination comprising a plurality of pallets for supporting such material, each pallet including a [recess] *pair of recesses, one recess* adjacent each side, upper rail means supporting a plurality of pallets for movement therealong while supporting the material being sintered, lower rail means supporting a plurality of empty pallets for return movement therealong in an opposite direction under the influence of gravity, [and] rotatable power-actuated sprocket means at one end of the rail means, said sprocket means including [a plurality of pairs of spaced apart teeth] *a pair of rotatable sprockets rigidly connected to each other, each sprocket including a sprocket body and a set of sprocket teeth* arranged about [its] *the* periphery *of the sprocket body, the sprocket means presenting a plurality of pairs of spaced apart teeth* for engaging *pairs of* the recesses of the pallets and successively raising the pallets from the lower rail means to the upper rail means and pushing the *plurality of* pallets along the upper rail means upon rotation of said sprocket means, said teeth being thinner than *the corresponding dimension of* the recesses, [and one tooth of each pair of teeth being positioned ahead of the other tooth of said pair.] *means associated with each tooth of each pair for adjusting the position of the leading edge of one tooth of the pair relative to the leading edge of the other tooth of the pair without disturbing the rigid connection of the sprockets.*

12. In apparatus for continuously sintering metal bearing material, the combination comprising a plurality of pallets for supporting such material, each pallet including a recess adjacent each side, upper rail means supporting a plurality of pallets for movement therealong while supporting the material being sintered, lower rail means supporting a plurality of empty pallets for return movement therealong in an opposite direction under the influence of gravity and rotatable power-actuated sprocket means at one end of the rail means, said sprocket means including [a plurality of pairs of spaced apart teeth arranged about its periphery] *a pair of rotatable sprockets each sprocket including a sprocket body and a set of sprocket teeth arranged about the periphery of the body* for engaging the recesses of the pallets and successively raising the pallets from the lower rail means to the upper rail means and pushing the pallets along the upper rail means upon rotation of said sprocket means, said teeth being thinner than *the corresponding dimension of* the recesses [and one tooth of each pair of teeth having at least its trailing edge positioned ahead of the trailing edge of the other tooth of said pair.] *the teeth of one sprocket having at least their leading edges positioned ahead of the leading edges of the corresponding teeth of the other sprocket, means for changing the position of at least the leading edges of the teeth carried by at least one sprocket body relative to that sprocket body and locking means for anchoring the leading edges of the teeth in the changed position.*

13. In apparatus for continuously sintering metal bearing material, the combination comprising a plurality of pallets for supporting such material, each pallet including a recess adjacent each side, upper rail means supporting a plurality of pallets for movement therealong while supporting the material being sintered, lower rail means supporting a plurality of empty pallets for return movement therealong in an opposite direction under the influence of gravity, and rotatable power-actuated sprocket means at one end of the rail means, said sprocket means including a plurality of pairs of spaced apart teeth arranged about its periphery for engaging the recesses of the pallets and successively raising the pallets from the lower rail means to the upper rail means and pushing the pallets along the upper rail means upon rotation of said sprocket means, said teeth being thinner than the recesses and at least one tooth of each pair being movably supported for movement relative to the other tooth of the pair in an arc about said axis.

14. In apparatus for continuously sintering metal bearing material, the combination comprising a plurality of pallets for supporting the material while being sintered, rail means including upper rail means supporting a plurality of pallets for movement therealong while supporting the material being sintered and lower rail means supporting a plurality of empty pallets for return movement therealong in an opposite direction, and power-actuated sprocket means at one end of the rail means and rotatable about a horizontal transverse axis to lift the returning pallets from the lower rail means through an arc to the upper rail means and to push the lifted pallet along the upper rail means, said sprocket means including a pair of rotatable sprockets, each sprocket including a body and a set of sprocket teeth arranged about the periphery of the body, the two sets of sprocket teeth being adapted to engage opposite side portions of the pallets, the pallets tending to cant and crowd toward one side of the rail means and the teeth of at least one set being adjustable relative to the corresponding sprocket body in an arc about said axis to reduce the canting and crowding of the pallets, releasable locking means operable to lock the [movable] *adjustable* teeth in a fixed position on the corresponding bodies and releasable to permit such [movement] *adjustment* of the teeth relative to the corresponding body.

15. In combination with a sintering machine for continuously sintering metal bearing material, the sintering machine including elongated upper rail means supporting a plurality of pallets for movement therealong while supporting the material being sintered and elongated lower rail means supporting a plurality of empty pallets for return movement therealong in an opposite direction, the pallets tending to cant and crowd toward one side of the rail means; power actuated sprocket means at one end of the rail means including a pair of sprockets each including a body and a set of sprocket teeth arranged about the periphery of the body, the sprockets being rotatable about a horizontal transverse axis to lift the returning pallets from the lower rail means up through an arc onto the upper rail means and to push the lifted pallets along the upper rail means with the two sets of sprockets being adapted to engage opposite side portions of the pallets as the pallets are moved from the lower up onto the upper rail means, means connecting at least one set of the teeth to the corresponding sprocket body and being constructed and arranged to permit adjusting movement of the one set of teeth relative to the corresponding sprocket body and relative to the other set of teeth in an arc about said axis to reduce canting and crowding of the pallets on the rail means, and releasable locking means operable to lock the movable teeth in a fixed position on the corresponding sprocket body and releasable to permit such adjusting movement of the teeth relative to the corresponding sprocket body.

References Cited in the file of this patent or the original patent

UNITED STATES PATENTS

| | | |
|---|---|---|
| 588,577 | Humphreys | Aug. 24, 1897 |
| 717,976 | Dodge | Jan. 6, 1903 |
| 1,764,696 | Shallock | June 17, 1930 |
| 1,934,986 | Magee | Nov. 14, 1933 |
| 2,382,740 | Noffsinger | Aug. 14, 1945 |